United States Patent
Nakajima et al.

(10) Patent No.: US 9,751,362 B2
(45) Date of Patent: Sep. 5, 2017

(54) WHEEL SECURING AXLE AND BICYCLE HUB ASSEMBLY

(71) Applicant: Shimano Inc., Sakai, Osaka (JP)

(72) Inventors: Jun Nakajima, Sakai (JP); Kazuki Koshiyama, Sakai (JP)

(73) Assignee: Shimano Inc., Osaka (JP)

( * ) Notice: Subject to any disclaimer, the term of this patent is extended or adjusted under 35 U.S.C. 154(b) by 177 days.

(21) Appl. No.: 14/543,913

(22) Filed: Nov. 18, 2014

(65) Prior Publication Data

US 2016/0137256 A1    May 19, 2016

(51) Int. Cl.
| | |
|---|---|
| *B62K 25/02* | (2006.01) |
| *B60B 27/02* | (2006.01) |
| *B60B 35/04* | (2006.01) |
| *B60B 35/00* | (2006.01) |
| *B60B 35/10* | (2006.01) |
| *B60B 35/02* | (2006.01) |

(52) U.S. Cl.
CPC .......... *B60B 27/023* (2013.01); *B60B 27/026* (2013.01); *B60B 35/004* (2013.01); *B60B 35/025* (2013.01); *B60B 35/04* (2013.01); *B60B 35/109* (2013.01); *B62K 25/02* (2013.01)

(58) Field of Classification Search
CPC ....... B62K 25/02; B60B 35/004; B60B 35/04; B60B 35/109; B60B 27/023; B60B 27/026
USPC ........................................... 301/110.5, 124.2
See application file for complete search history.

(56) References Cited

U.S. PATENT DOCUMENTS

| | | | | |
|---|---|---|---|---|
| 3,963,361 A | * | 6/1976 | Schenk | F16D 1/108 301/111.01 |
| 4,679,862 A | * | 7/1987 | Luo | A61G 5/10 301/112 |
| 4,964,287 A | * | 10/1990 | Gaul | B62H 5/001 224/924 |
| 5,012,575 A | * | 5/1991 | Heideman | B60B 35/04 280/79.11 |
| 5,118,125 A | | 6/1992 | Plunkett | |
| 5,190,301 A | * | 3/1993 | Malewicz | A63C 17/0073 280/11.223 |
| 5,265,824 A | * | 11/1993 | Sato | A01K 89/015 242/268 |
| 5,314,279 A | | 5/1994 | Ewing | |
| 5,875,947 A | * | 3/1999 | Noel | B60R 9/10 211/17 |
| 6,120,106 A | * | 9/2000 | Liao | B60B 37/10 301/111.06 |
| 6,152,541 A | | 11/2000 | Huber | |
| 6,523,659 B2 | | 2/2003 | Kanehisa et al. | |
| 6,886,894 B2 | | 5/2005 | Kanehisa et al. | |
| 7,556,321 B2 | | 7/2009 | Hara et al. | |
| 7,654,546 B2 | | 2/2010 | Watarai | |

(Continued)

FOREIGN PATENT DOCUMENTS

WO    2009150518 A1    12/2009

OTHER PUBLICATIONS

Office Action of U.S. Appl. No. 14/819,455 dated Nov. 18, 2016.

*Primary Examiner* — S. Joseph Morano
*Assistant Examiner* — Scott A Browne

(57) ABSTRACT

A wheel securing axle includes a shaft that includes a first end portion, a second end portion including a thread, and a shaft axis, a washer rotationally supported by the first end portion of the shaft, and a click mechanism arranged between the shaft and the washer.

15 Claims, 12 Drawing Sheets

(56) References Cited

U.S. PATENT DOCUMENTS

| | | |
|---|---|---|
| 7,735,937 B2 | 6/2010 | Chonan |
| 8,641,151 B2 * | 2/2014 | Kamada ................. B62M 9/125 192/64 |
| 8,777,330 B2 * | 7/2014 | Lim ....................... B62K 25/02 301/124.2 |
| 2009/0102276 A1 * | 4/2009 | Mercat ................... B62K 25/02 301/124.2 |
| 2012/0321373 A1 * | 12/2012 | Chang .................... B62K 25/02 403/106 |
| 2013/0140876 A1 * | 6/2013 | Lim ....................... B62K 25/02 301/124.2 |
| 2013/0328385 A1 | 12/2013 | Kuo |
| 2016/0214678 A1 * | 7/2016 | Schlanger .............. B62K 25/02 |

\* cited by examiner

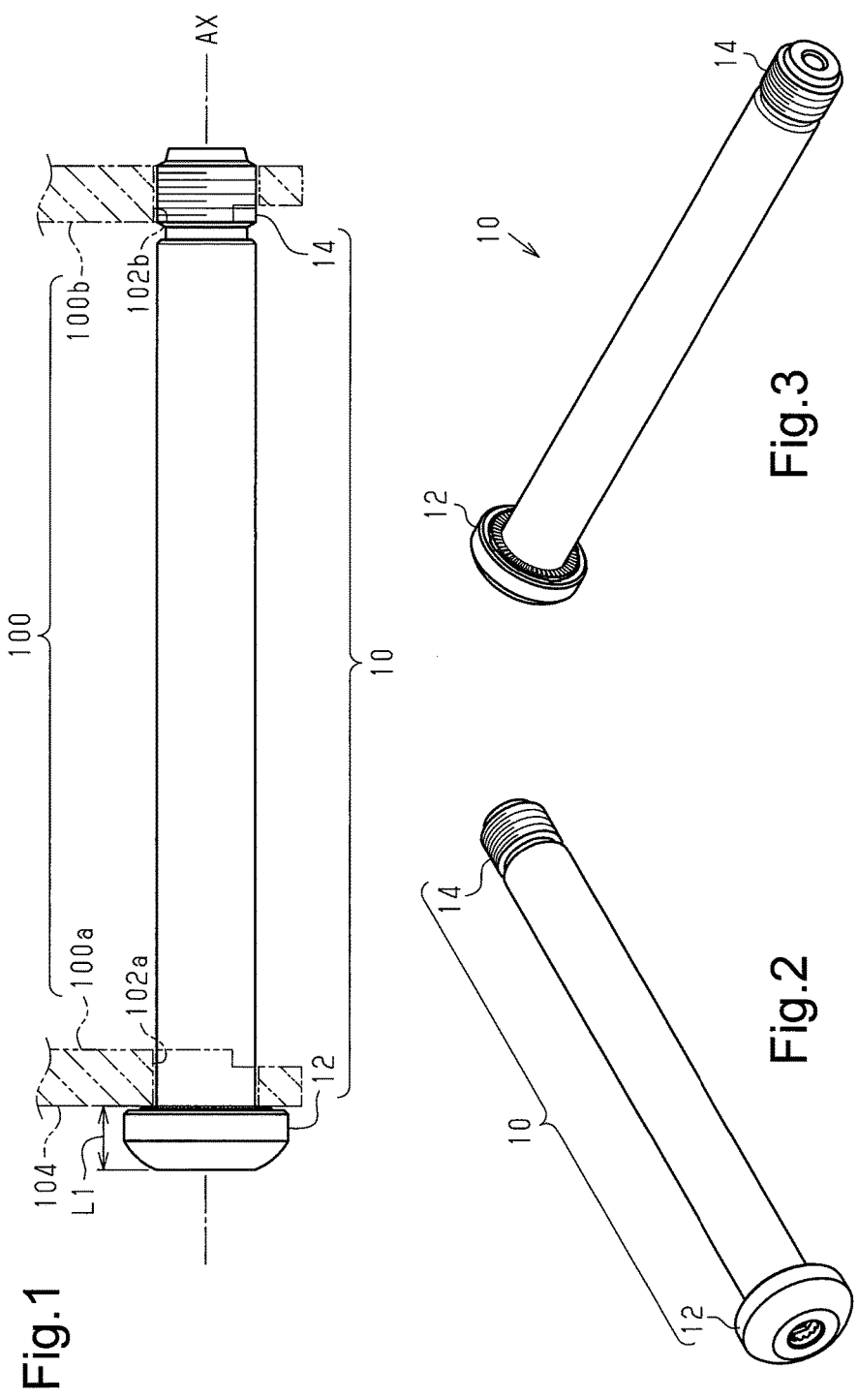

WHEEL SECURING AXLE AND BICYCLE HUB ASSEMBLY

TECHNICAL FIELD

The present invention relates to a wheel securing axle and a bicycle hub assembly.

BACKGROUND ART

A typical bicycle wheel is coupled to a hub support of a bicycle frame by a bicycle hub assembly. A bicycle hub assembly includes a hub shell, a hollow hub axle, and a wheel securing axle. A wheel rim is supported by spokes on the hub shell. For example, the hub shell is rotationally supported by a bearing on the hollow hub axle. The wheel securing axle is inserted through the hollow hub axle. The wheel securing axle includes a head (basal portion) and a threaded distal portion that project from opposite ends of the hollow hub axle in the axial direction. The threaded distal portion of the wheel securing axle is engaged with a nut or a threaded through hole of the hub support. This couples the wheel securing axle to the bicycle frame. U.S. Pat. No. 6,886,894 to Kanehisa, which is incorporated herein by reference, describes one example of a conventional wheel securing axle.

SUMMARY OF THE INVENTION

A first aspect of a wheel securing axle according to the present invention includes a shaft that includes a first end portion, a second end portion including a thread, and a shaft axis, a washer rotationally supported by the first end portion of the shaft, and a click mechanism arranged between the shaft and the washer.

In one example, the click mechanism is configured to allow the shaft to rotate around the shaft axis when the washer is in contact with a fastened surface and kept from rotating relative to the fastened surface.

In one example, the click mechanism is configured so that the washer rotates integrally with the shaft at least when the washer is not in contact with the fastened surface.

In one example, the wheel securing axle further includes a housing that is coupled to the first end portion and accommodates at least a portion of the washer. The click mechanism is configured so that the shaft rotates integrally with the housing and the washer at least when the washer is not in contact with the fastened surface.

In one example, the click mechanism includes at least one first click element formed on one of the washer and the housing, at least one second click element formed on the other of the washer and the housing, and an urging member that elastically urges the housing toward the washer in an axial direction so that the first click element elastically engages the second click element.

In one example, the at least one first click element is a plurality of projections formed around the shaft axis at equal angular intervals. Each of the projections includes first and second inclined surfaces inclined at different angles and a peak formed between the first and second inclined surfaces.

In one example, the at least one second click element is a plurality of recesses formed around the shaft axis at equal angular intervals. Each of the recesses includes third and fourth inclined surfaces inclined at different angles and a bottom formed between the third and fourth inclined surfaces.

In one example, the urging member urges the housing toward the washer so that the housing is movable in the axial direction relative to the washer.

In one example, the housing is supported by the shaft so that the housing is rotatable around the shaft axis together with or free from the washer.

In one example, the shaft includes a built-in socket formed in an end surface of the first end portion, and the housing includes a center hole that allows a rotation tool to physically access the built-in socket.

In one example, the shaft includes a shaft opening formed in an end surface of the first end portion. The wheel securing axle further includes a socket fitted to the shaft opening. The click mechanism includes at least one first click element formed on one of the socket and the housing, at least one second click element formed on the other of the socket and the housing, and an urging member that is arranged in the shaft opening and urges the socket toward the housing in an axial direction so that the first click element engages the second click element.

In one example, the socket is a cup-shaped socket that includes a socket opening and an outward flange. The housing includes an inward flange that includes a center hole allowing a rotation tool to physically access the socket opening. The at least one first click element and the at least one second click element are formed on the outward flange of the socket and the inward flange of the housing.

In one example, the at least one first click element is a plurality of projections formed around the shaft axis at equal angular intervals. Each of the projections includes first and second inclined surfaces inclined at the same angle or at different angles and a peak formed between the first and second inclined surfaces.

In one example, the at least one second click element is a plurality of recesses formed around the shaft axis at equal angular intervals. Each of the recesses includes third and fourth inclined surfaces that are inclined at the same angle or at different angles and a bottom formed between the third and fourth inclined surfaces.

In one example, the socket is movable in the axial direction relative to the shaft when the washer is in contact with the fastened surface.

In one example, the washer, the housing, and the socket are integrally movable in the axial direction relative to the shaft at least when the washer is not in contact with the fastened surface.

In one example, the shaft includes a shaft circumferential surface that supports the washer so that the washer is movable in the axial direction, and a washer stopper that projects from the shaft circumferential surface in a radially outward direction and limits movement of the washer in the axial direction by contacting the washer in the axial direction. The click mechanism includes an urging member that generates an elastic repulsion force in the axial direction to allow the washer stopper to rotate relative to the washer while contacting the washer when the washer is in contact with the fastened surface.

In one example, the washer is a cup-shaped washer that surrounds an outer side of the washer stopper.

In one example, the washer includes a non-smooth surface that contacts the fastened surface and a smooth surface that contacts the washer stopper.

In one example, the wheel securing axle further includes an elastic element that is arranged on the second end portion of the shaft toward a distal side from the thread to prevent separation of the shaft. The elastic element has a maximum outer dimension that is larger than a diameter of the thread.

The elastic element is capable of being elastically compressed to the diameter of the thread or smaller.

In one example, the shaft is a hollow body including a center through passage.

Another aspect of the present invention provides a bicycle hub assembly that includes the above wheel securing axle, a hub axle that includes a hub axis and is secured to a bicycle frame by the wheel securing axle, and a hub shell that is supported by the hub axle to be rotatable at least around the hub axis.

Other aspects and advantages of the invention will become apparent from the following description, taken in conjunction with the accompanying drawings, illustrating by way of example the principles of the invention.

BRIEF DESCRIPTION OF THE DRAWINGS

Novel features of the invention will become apparent from the accompanying claims. The invention, together with objects and advantages thereof, may best be understood by reference to the following description of the presently preferred embodiments together with the accompanying drawings in which:

FIG. 1 is a side view of a first embodiment of a wheel securing axle;

FIGS. 2 and 3 are perspective views of the wheel securing axle of FIG. 1;

EMBODIMENTS OF THE INVENTION

Figure 4:
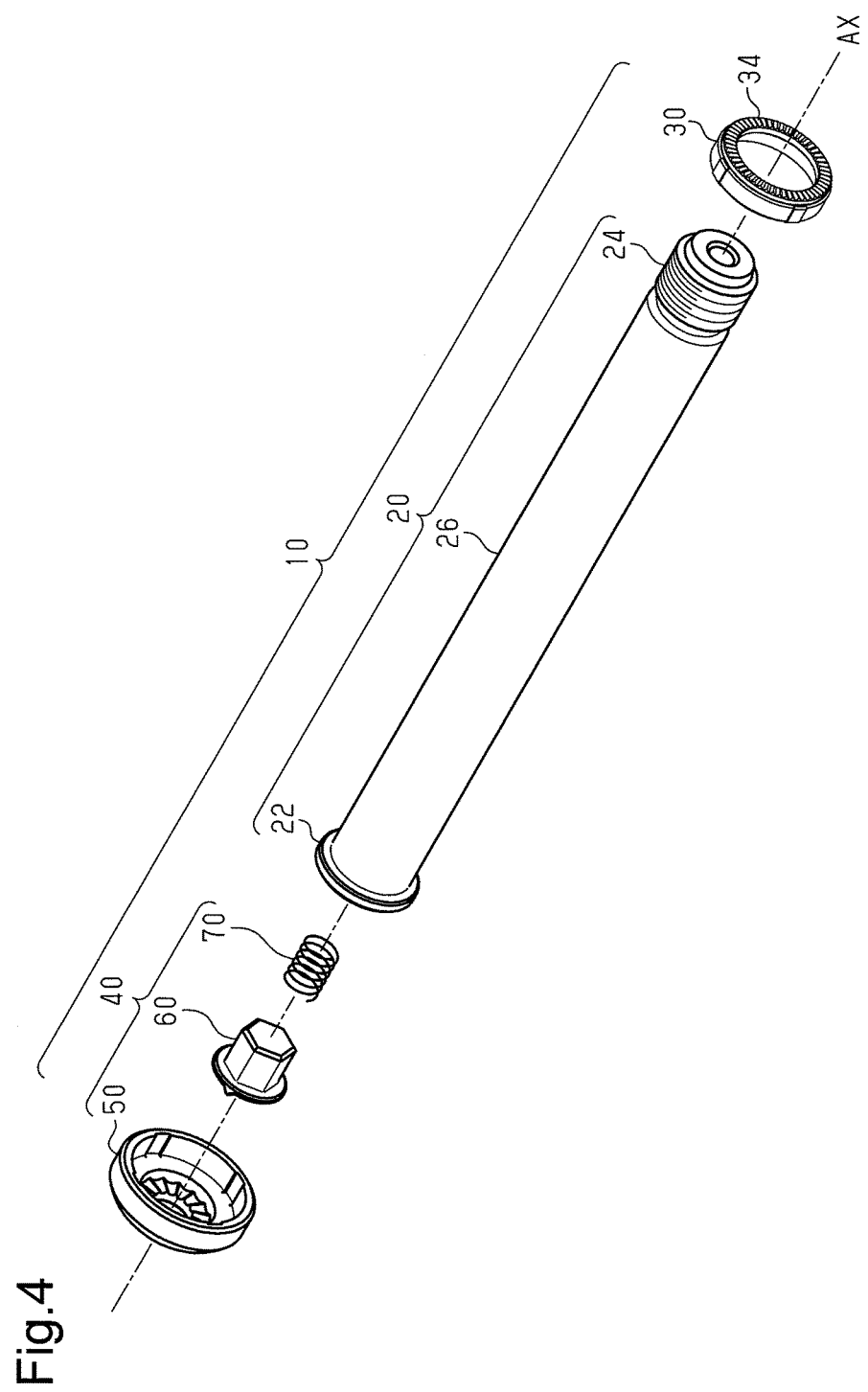
FIGS. 4 and 5 are exploded perspective views of the wheel securing axle of FIG. 1.

Several embodiments of a wheel securing axle will now be described with reference to the drawings.

As shown in FIGS. 1 to 3, a first embodiment of a wheel securing axle 10 includes a basal portion 12 (also referred to as a head) and a threaded distal portion 14. A bicycle frame 100 includes hub supports 100a and 100b. The wheel securing axle 10 is secured to the bicycle frame 100 by the hub supports 100a and 100b. The basal portion 12 of the wheel securing axle 10 is pressed against a fastened surface 104 in the axial direction. The fastened surface 104 may be a side surface of the bicycle frame 100. The hub support 100a of the first embodiment includes a through hole 102a. The hub support 100b includes a female-threaded through hole 102b.

Figure 5:
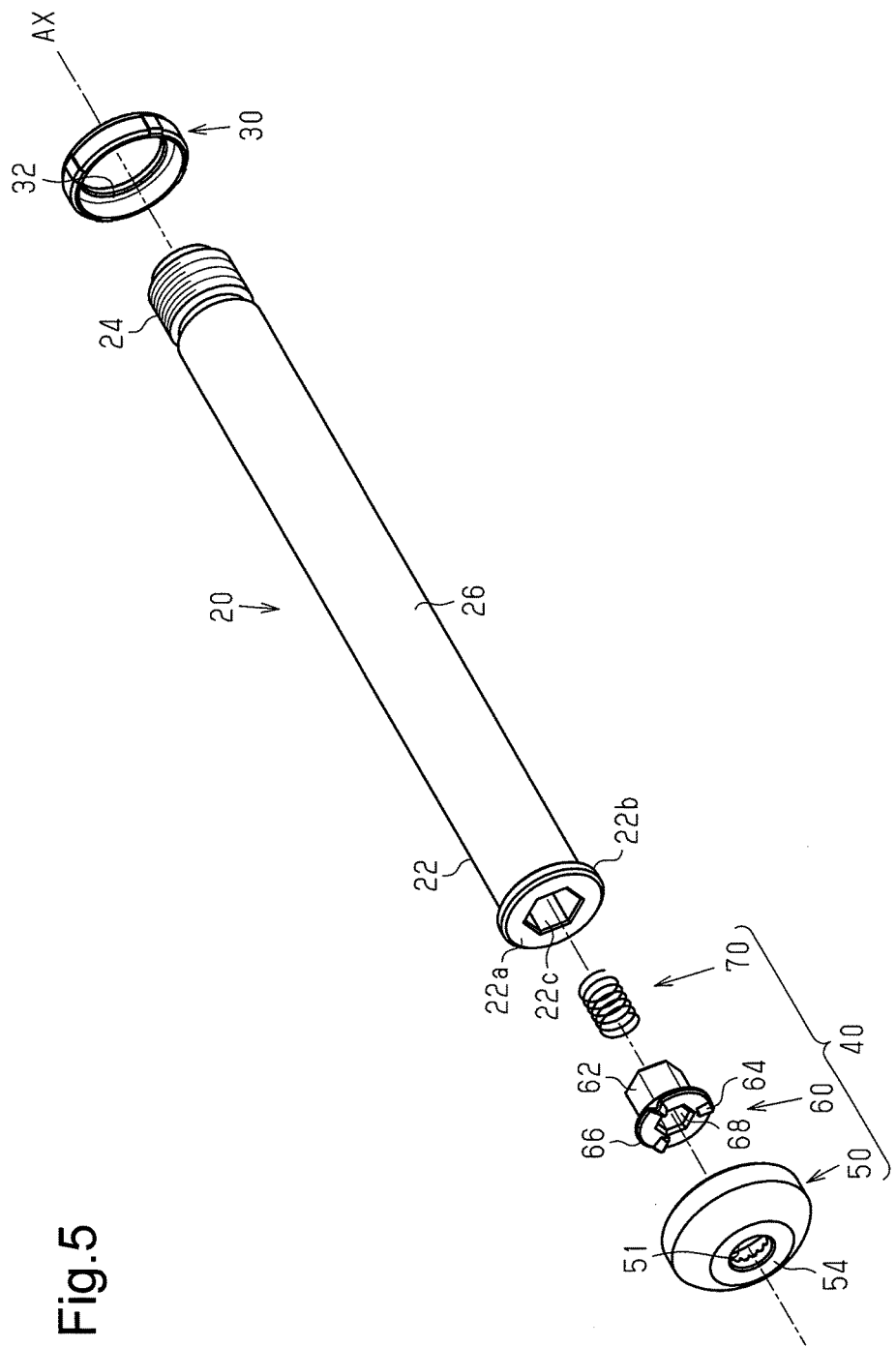

As shown in FIGS. 4 and 5, the wheel securing axle 10 includes a shaft 20 (also referred to as a skewer shaft), a washer 30, and a click mechanism 40.

The shaft 20 includes a first end portion 22, a second end portion 24 including threads, and a shaft axis AX. As shown in FIG. 5, the shaft 20 includes a shaft opening 22c in an end surface 22a of the first end portion 22. The shaft opening 22c is non-circular and is, for example, a hexagonal hole.

The shaft 20 of the first embodiment includes a shaft circumferential surface 26 and a washer stopper 22b that extends from the shaft circumferential surface 26 in a radially outward direction. Axial movement of the washer 30 is limited when the washer stopper 22b contacts the washer 30 in the axial direction. Although not particularly limited, the washer stopper 22b may be a flange or a projection. The washer stopper 22b may be a portion of the shaft 20 or a dedicated component separate from the shaft 20, for example, a C-shaped ring that is attached to a groove formed in the shaft circumferential surface 26.

Figure 6:
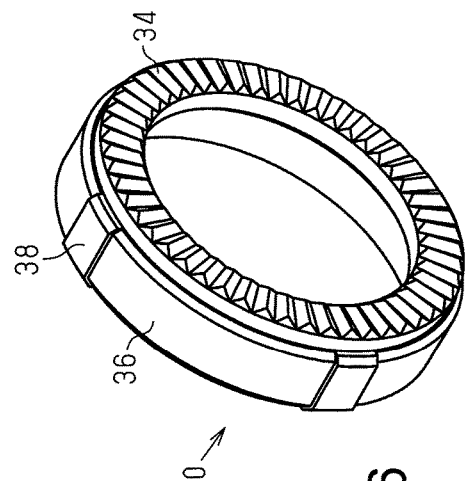
FIG. 6 is a perspective view of a washer.

The washer 30 is moved from the second end portion 24 to the first end portion 22 along the shaft circumferential surface 26 and coupled to the shaft 20 at the first end portion 22. As shown in FIGS. 4 to 6, the washer 30 includes a smooth surface 32 and a non-smooth surface 34. The non-smooth surface 34 of the washer 30 contacts the fastened surface 104 of the bicycle frame 100 (refer to FIG. 1). Although not particularly limited, the non-smooth surface 34 may be, for example, a rough surface, a knurled surface, a surface including regular or irregular projections, or a surface including regular or irregular grooves. The smooth surface 32 of the washer 30 contacts the washer stopper 22b. The washer 30 is rotationally supported by the first end portion 22 of the shaft 20 when contacting the washer stopper 22b. The washer 30 is cup-shaped and surrounds an outer side of the washer stopper 22b. The washer 30 includes at least one projection 38 projecting from a rim 36 in the radially outward direction. The washer 30 of the first embodiment includes a plurality of the projections 38 arranged at equal angular intervals. Each projection 38 extends in a straight manner and in a direction parallel to the shaft axis AX.

As shown in FIGS. 4 and 5, a housing 50, a socket 60, and an urging member 70 are coupled to the first end portion 22 of the shaft 20.

Figure 7:
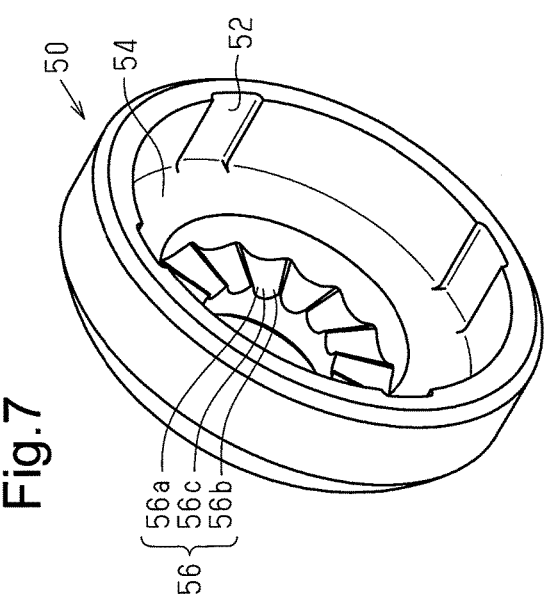
FIG. 7 is a perspective view of a housing that includes a click element.

Referring to FIGS. 4, 5, and 7, the housing 50 accommodates at least a portion of the washer 30. The housing 50 includes grooves 52 that engage the projections 38. The engagement of the projections 38 and the grooves 52 integrally rotates the housing 50 and the washer 30. The housing 50 includes an inward flange 54 defining a center hole 51.

Figure 8:
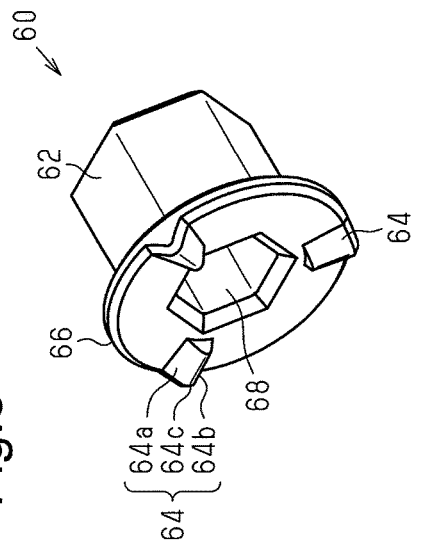
FIG. 8 is a perspective view of a socket that includes a click element.

As shown in FIGS. 4, 5, and 8, the socket 60 includes a shaft 62 fitted to the shaft opening 22c of the shaft 20. The shaft 62 of the first embodiment is hexagonal and includes six engagement surfaces or corners in correspondence with the shaft opening 22c. The socket 60 includes a socket opening 68, which is in communication with the center hole 51 of the housing 50. The socket opening 68 functions as an engagement portion that engages a rotation tool, such as, an Allen key or an electric power tool. The socket opening 68 is, for example, a hexagonal hole. A rotation tool engages the socket opening 68 through the center hole 51 of the housing 50.

The click mechanism 40 will now be described with reference to FIGS. 7 to 9.

The click mechanism 40 is arranged between the shaft 20 and the washer 30. The click mechanism 40 is configured to allow for a relative rotation of the washer 30 and the shaft 20 when a torsion moment exceeding a torque threshold or a rotation resistance (described later) is generated between the washer 30 and the shaft 20. The click mechanism 40 of the first embodiment is formed by a plurality of first click elements 64 formed on the socket 60, a plurality of second click elements 56 formed in the housing 50, and the urging member 70.

The first click elements 64 are a plurality of projections formed on an outward flange 66 of the socket 60 at equal angular intervals around the shaft axis AX. Each projection includes a first inclined surface 64a, a second inclined surface 64b, and a peak 64c formed between the first inclined surface 64a and the second inclined surface 64b. The first and second inclined surfaces 64a and 64b of the first embodiment are inclined at the same angle with respect to the outward flange 66 of the socket 60. The first and second inclined surfaces 64a and 64b may be inclined at different angles. Although the first and second inclined surfaces 64a and 64b of the first embodiment are flat, the first and second inclined surfaces 64a and 64b may be curved. Although the first click element 64 of the first embodiment is a ridge-like elongated projection, the first click element 64 may be a tapered projection having a peak or a hemispherical projection.

The second click elements 56 are a plurality of recesses formed in the inward flange 54 of the housing 50 at equal angular intervals around the shaft axis AX. Each recess includes a third inclined surface 56a, a fourth inclined surface 56b, and a bottom 56c formed between the third inclined surface 56a and the fourth inclined surface 56b. The third and fourth inclined surfaces 56a and 56b are inclined at the same angle with respect to the inward flange 54 of the housing 50. The third and fourth inclined surfaces 56a and 56b may be inclined at different angles. The third and fourth inclined surfaces 56a and 56b may be flat or curved. Although the second click element 56 of the first embodiment is a valley-like recess, the second click element 56 may be a dimple.

Figure 9:
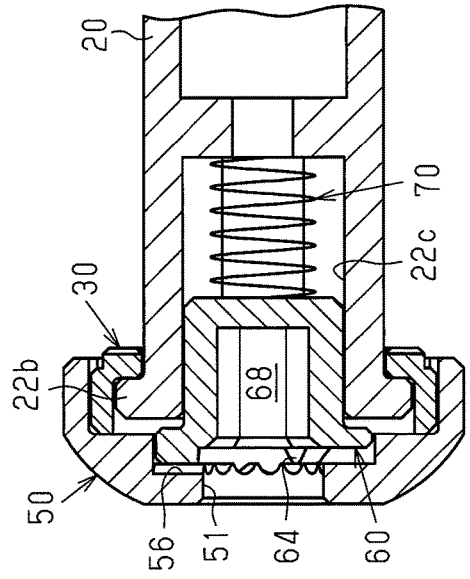

As shown in FIG. 9, the urging member 70, which is accommodated in the shaft opening 22c, urges the socket 60 toward the housing 50 in the axial direction. The urging member 70 is, for example, a compression coil spring. When the urging member 70 urges the socket 60 in the axial direction, each of the first click elements 64 engages one of the second click elements 56.

The operation of the click mechanism 40 will now be described with reference to FIGS. 10 and 11.

Figure 11:
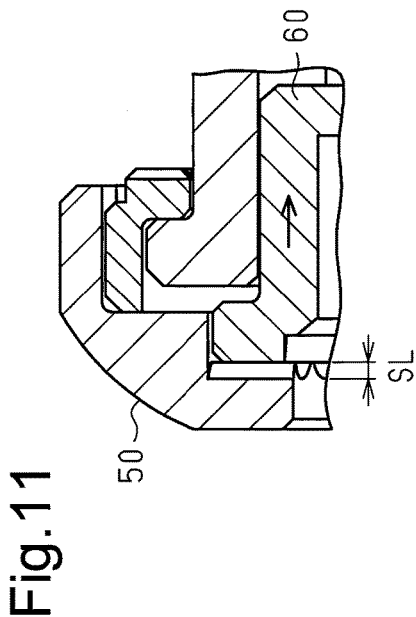
FIGS. 9 to 11 are partially cross-sectional views of the wheel securing axle.
Figure 10:
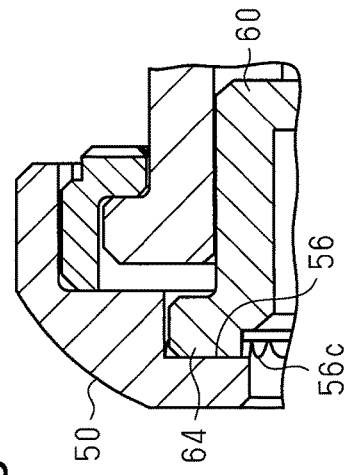

The present description respectively defines the locations of the wheel securing axle 10 in FIGS. 10 and 11 as a normal position and a shifted position of. At the normal position shown in FIG. 10, the peaks 64c of the first click elements 64 engage the bottoms 56c of the second click elements 56. At the shifted position shown in FIG. 11, the peaks 64c of the first click elements 64 each contact a boundary of adjacent ones of the second click elements 56. The urging member 70 allows the socket 60 to move in the shaft opening 22c between the normal position (FIG. 10) and the shifted position (FIG. 11) only by a click stroke SL in the axial direction. The click mechanism 40 has a torque threshold or a rotation resistance in accordance with, for example, the geometry of the click elements 56 and 64 and the elastic repulsion coefficient (spring constant) of the urging member 70.

A user, who may be a rider or a serviceman, may secure the wheel securing axle 10 to the bicycle frame 100. The user engages a rotation tool with the socket opening 68 through the center hole 51 of the housing 50 and rotates the socket 60 with the rotation tool. Rotation of the socket 60 rotates the shaft 20 and fastens the threaded distal portion 14 of the wheel securing axle 10 to the female-threaded through hole 102b of the hub support 100b.

At least when the washer 30 is not in contact with the fastened surface 104 of the bicycle frame 100, the socket 60 and housing 50 do not relatively rotate and the click mechanism 40 generates no clicks. Thus, the shaft 20 and the washer 30 integrally rotate.

When the non-smooth surface 34 of the washer 30 is in contact with the fastened surface 104 of the bicycle frame 100, the wheel securing axle 10 generates an axial force or a fastening force, and the torsion moment increases between the washer 30 and the shaft 20. When the torsion moment exceeds the torque threshold of the click mechanism 40, the socket 60 and the housing 50 relatively rotate and the click mechanism 40 generates clicks. Although the shaft 20 continues to rotate around the shaft axis AX, the click mechanism 40 keeps the washer 30 non-rotated relative to the fastened surface 104. This prevents or reduces damage caused by rotation of the washer 30 to the fastened surface 104 when securing the wheel securing axle 10 to the bicycle frame 100.

When relative rotation of the washer 30 and the shaft 20 occurs, the click mechanism 40 generates clicks. A user can recognize an approximate or appropriate fastening torque based on the clicks generated by the click mechanism 40 or the number of the clicks.

A situation in which the user removes the wheel securing axle 10 from the bicycle frame 100 will now be described. In an initial stage in which the wheel securing axle 10 is loosened, the user uses a rotation tool to rotate the socket 60 (and shaft 20) with a relatively high torque. In this case, the click mechanism 40 continuously generates clicks. The click mechanism 40 keeps the washer 30 from rotating when the non-smooth surface 34 of the washer 30 is in contact with the fastened surface 104 of the bicycle frame 100. This prevents or reduces damage to the fastened surface 104 caused by the rotation of the washer 30.

Rotation of the shaft 20 decreases the axial force or the fastening force of the wheel securing axle 10 and the torsion moment between the washer 30 and the shaft 20. When the non-smooth surface 34 of the washer 30 is disengaged from the fastened surface 104 of the bicycle frame 100, the click mechanism 40 stops generating clicks. The washer 30 and the housing 50 rotate integrally with the shaft 20 and the socket 60. This allows for removal of the wheel securing axle 10 from the bicycle frame 100 without or practically without the washer 30 being loose relative to the shaft 20.

The first embodiment has the advantages described below.

(1) The wheel securing axle 10 includes the shaft 20 that includes the first end portion 22, the second end portion 24 including threads, and the shaft axis AX, the washer 30 rotationally supported by the first end portion 22 of the shaft 20, and the click mechanism 40 arranged between the shaft 20 and the washer 30. The click mechanism 40 prevents or reduces damage to the fastened surface 104 caused by rotation of the washer 30. Additionally, the click mechanism 40 generates clicks. This allows the user to know the approximate fastening torque. For example, when the environment is dim or when in a dark place, the user does not have to see the washer 30 to recognize that the washer 30 is in contact with the fastened surface 104 by referring to the clicking sound or clicking vibration of the click mechanism 40.

(2) The wheel securing axle 10 includes a housing 50, which is coupled to the first end portion 22 and accommodates at least a portion of the washer 30. The click mechanism 40 is configured so that the shaft 20 rotates integrally with the housing 50 and the washer 30 at least when the washer 30 is not in contact with the fastened surface 104. In this configuration, the click mechanism 40 generates no click at least when the washer 30 is not in contact with the fastened surface 104. This allows the user to recognize at least whether or not the washer 30 is not in contact with the fastened surface 104.

(3) The shaft 20 includes the shaft opening 22c formed in the end surface 22a of the first end portion 22. The wheel securing axle 10 includes the socket 60, which is fitted to the shaft opening 22c. The click mechanism 40 includes at least one first click element 64, which is formed on one of the socket 60 and the housing 50, at least one second click element 56, which is formed on the other of the socket 60 and the housing 50, and the urging member 70. The urging member 70 is arranged in the shaft opening 22c and urges the socket 60 toward the housing 50 in the axial direction so that the first click element 64 engages the second click element 56. In this configuration, the click mechanism 40 generates clicks when the socket 60 simultaneously rotates and moves in the axial direction.

(4) The socket 60 includes the socket opening 68 and the outward flange 66. The housing 50 includes the inward flange 54, which includes the center hole 51 that allows a rotation tool to physically access the socket opening 68. The first click elements 64 and the second click elements 56 are respectively formed on the outward flange 66 of the socket 60 and the inward flange 54 of the housing 50. In this structure, a flat surface between the first click elements 64 of the outward flange 66 stabilizes rotation of the socket 60. Additionally, the click mechanism 40 generates clicks in the proximity of a rotation tool. This allows the user to directly and sensitively feel the clicks of the click mechanism 40.

(5) The first click elements 64 are projections formed around the shaft axis AX at equal angular intervals. Each projection includes the first inclined surface 64a and the second inclined surface 64b, which are inclined at the same angle or inclined at different angles. The peak 64c is formed between the first and second inclined surfaces. This structure allows for an increase in the number of clicks of the click mechanism 40 per rotation of the shaft 20. Additionally, the torque threshold of the click mechanism 40 may be constant regardless of the rotation direction of the shaft 20 or varied in accordance with the rotation direction of the shaft 20.

(6) The second click elements 56 are recesses formed around the shaft axis AX at equal angular intervals. Each recess includes the third inclined surface 56a and the fourth inclined surface 56b, which are inclined at the same angle or inclined at different angles. The bottom 56c is formed between the third and fourth inclined surfaces. This structure allows for an increase in the number of clicks of the click mechanism 40 per rotation of the shaft 20. Additionally, the torque threshold of the click mechanism 40 may be constant regardless of the rotation direction of the shaft 20 or varied in accordance with the rotation direction of the shaft 20.

(7) When the washer 30 is in contact with the fastened surface 104 of the bicycle frame 100, the socket 60 is movable in the axial direction relative to the shaft 20. Although vibration of the bicycle frame 100 is directly transmitted to the washer 30 from the fastened surface 104, movement of the socket 60 in the axial direction absorbs some of the vibration. Thus, the click mechanism 40 reduces the vibration transmitted to the shaft 20 and limits loosening of the shaft 20.

(8) At least when the washer 30 is not in contact with the fastened surface 104, the washer 30, the housing 50 and the socket 60 are integrally movable in the axial direction relative to the shaft 20. In this structure, when an impact is applied in the axial direction to the shaft 20 or the housing 50, the impact is partially absorbed by the axial movement of the shaft 20 relative to the subset of the washer 30, the housing 50, and the socket 60. This reduces damage to the wheel securing axle 10.

(9) The shaft 20 includes the shaft circumferential surface 26, which supports the washer 30 in a movable manner in the axial direction, and the washer stopper 22b, which projects from the shaft circumferential surface 26 in the radially outward direction and limits movement of the washer 30 in the axial direction by contacting the washer 30 in the axial direction. The click mechanism 40 includes the urging member 70, which generates an elastic repulsion force in the axial direction. When the washer 30 is in contact with the fastened surface 104, the elastic repulsion force allows the washer stopper 22b to rotate relative to the washer 30 while contacting the washer 30. In this structure, the repulsion force of the urging member 70 stabilizes the relative rotation of the washer 30 and the washer stopper 22b. Additionally, separation of the washer 30 from the shaft 20 may be prevented.

(10) The washer 30 is cup-shaped and surrounds the outer side of the washer stopper 22b. This structure prevents or reduces movement of the washer 30 and entrance of foreign material between the washer 30 and the washer stopper 22b.

(11) The washer 30 includes the non-smooth surface 34, which contacts the fastened surface 104, and the smooth surface 32, which contacts the washer stopper 22b. In this structure, the smooth surface 32 of the washer 30 does not interrupt rotation of the shaft 20. The non-smooth surface 34 and the smooth surface 32 significantly differ in the friction coefficient. Thus, the washer 30 immediately stops rotating when contacting the fastened surface 104. This prevents or reduces damage to the fastened surface 104 caused by rotation of the washer 30.

(12) The wheel securing axle 10 includes the socket opening 68, which is in communication with the center hole 51 of the housing 50 and functions as an engagement portion engaging a rotation tool. This structure reduces the air resistance of the wheel securing axle 10 compared with a lever type wheel securing axle.

(13) The urging member 70 is arranged in the shaft opening 22c. This structure reduces the head thickness L1 (refer to FIG. 1) of the wheel securing axle 10. The reduction of the head thickness L1 is preferred from the viewpoint of the air resistance. The head thickness L1 is 7.8 mm in the first embodiment. The head thickness L1 may be smaller than 7.8 mm.

A second embodiment of the wheel securing axle 10 will now be described with reference to FIGS. 12 to 20 focusing on the differences from the first embodiment.

Figure 12:
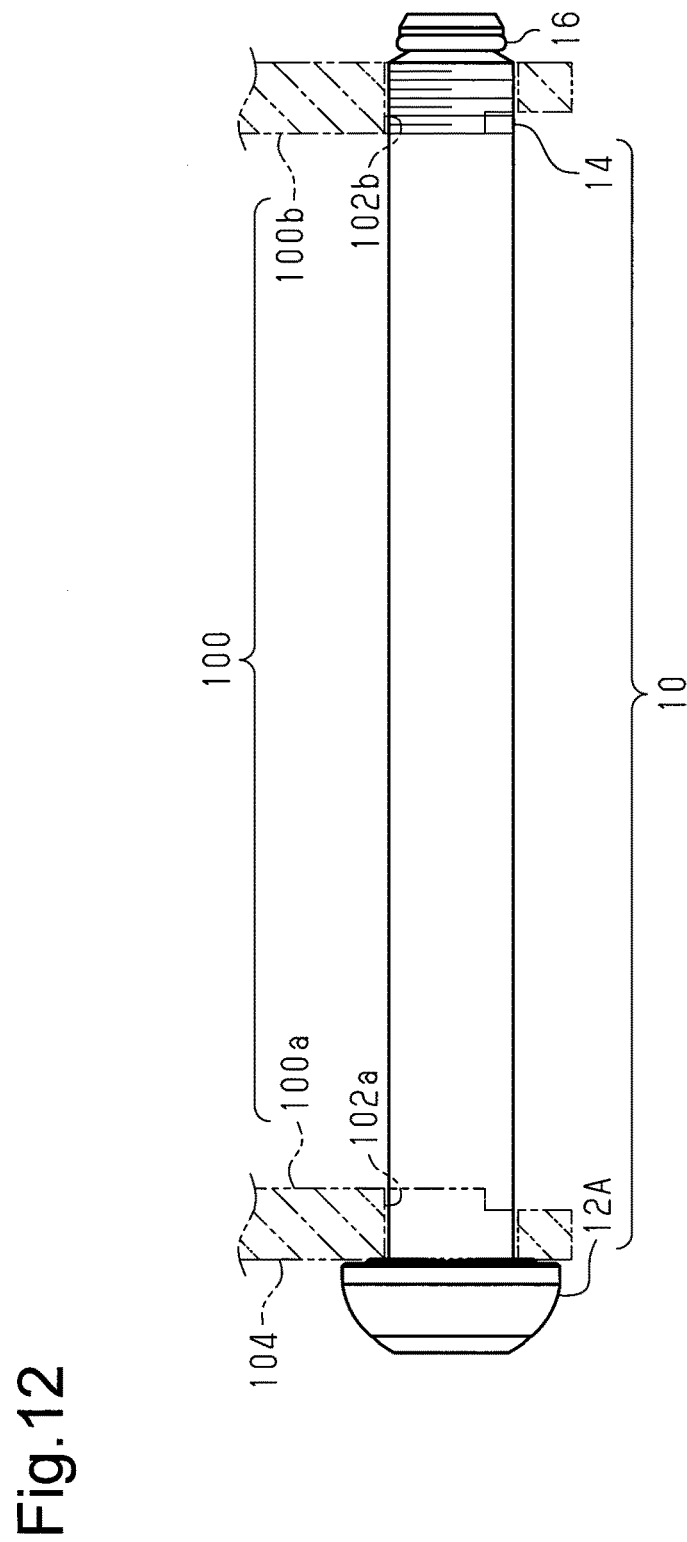
FIG. 12 is a side view of a second embodiment of a wheel securing axle.
Figure 13:
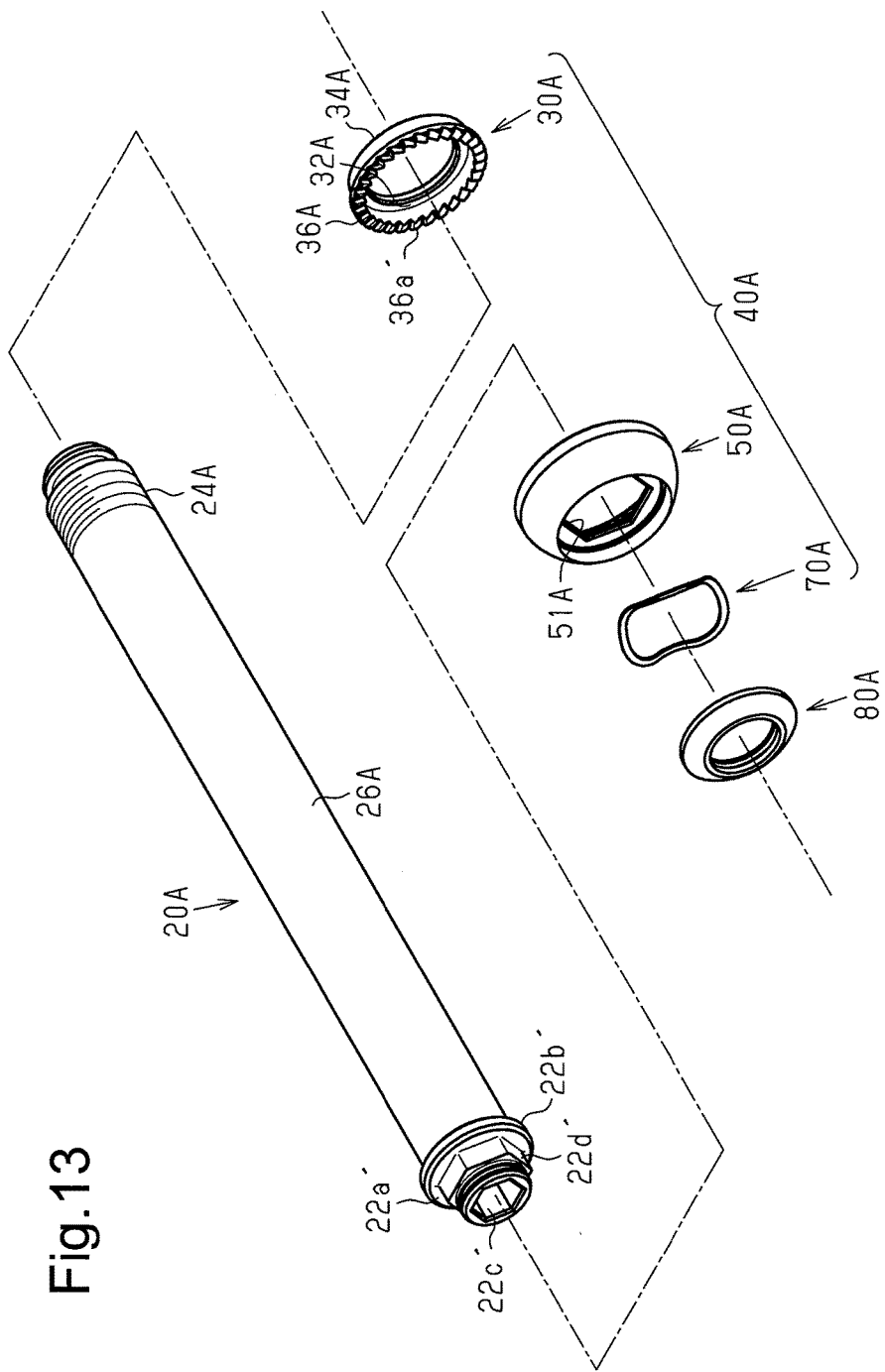
FIGS. 13 and 14 are exploded perspective views of the wheel securing axle of FIG. 12.
Figure 15:
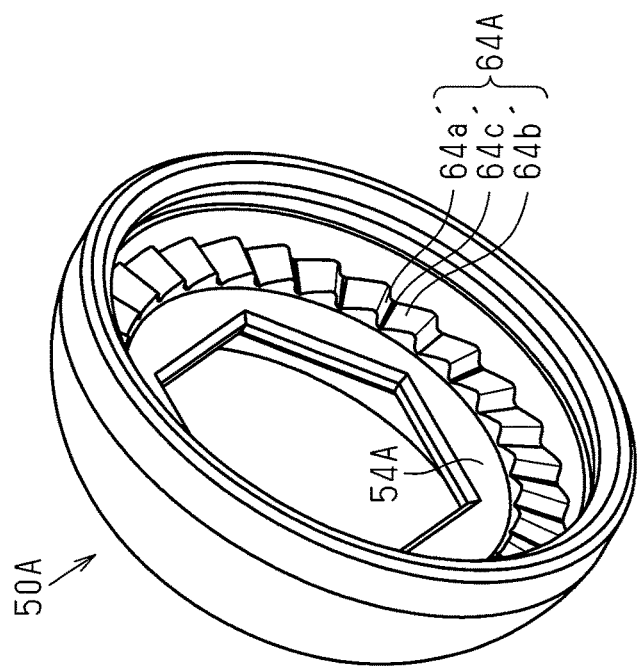
FIG. 15 is a perspective view of a housing that includes a click element.

As shown in FIG. 12, the wheel securing axle 10 includes the basal portion 12A and the threaded distal portion 14. As shown in FIG. 13, the shaft opening 22c' of the shaft 20A, which may be a hexagonal hole, functions as an engagement portion engaging a rotation tool. The shaft opening 22c' may be referred to as a built-in socket. As shown in FIGS. 13 and 15, the center hole 51A of the housing 50A is non-circular, for example, a hexagonal hole. A rotation tool may access the shaft opening 22c' through the center hole 51A of the housing 50A. The first end portion 22A of the shaft 20A includes a nut 22d'. The nut 22d' is formed to be fitted to the center hole 51A of the housing 50A. Thus, the housing 50A rotates integrally with the shaft 20A.

Figure 14:
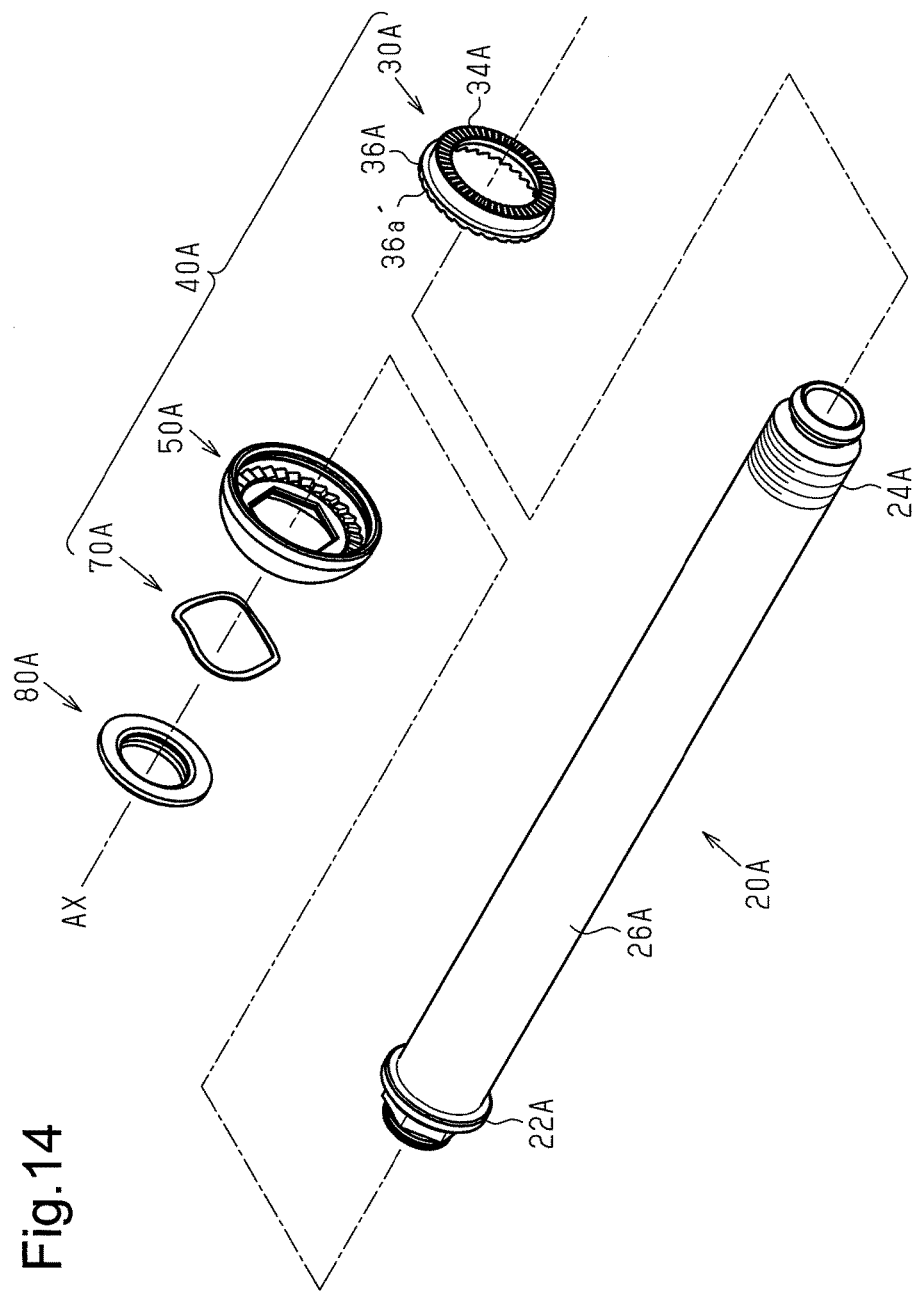
Figure 17:
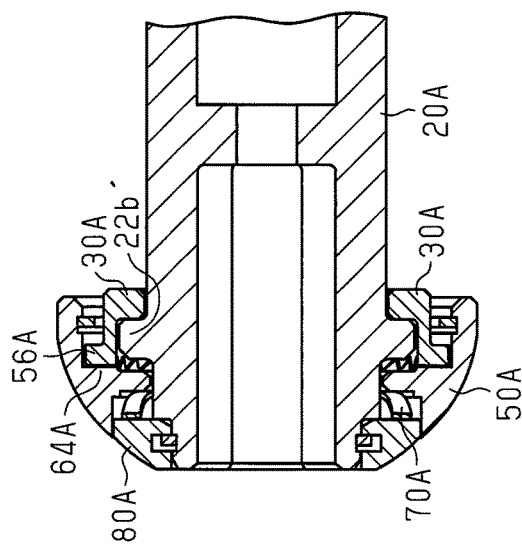
FIGS. 17 to 19 are partially cross-sectional views of the wheel securing axle of FIG. 12.

As shown in FIGS. 13, 14, and 17, the housing 50A is supported by the shaft 20A (includes a shaft circumferential surface 26A) and rotatable around the shaft axis AX together with or without the washer 30A. A cap 80A is secured to the shaft 20A with a C-shaped ring coupled proximate to the shaft opening 22c'. The urging member 70A is arranged in an annular gap formed between the cap 80A and the housing 50A. The urging member 70A urges the housing 50A toward the washer 30A so that the housing 50A can move in the axial direction relative to the washer 30A. The urging member 70A may be an undulated spring.

The click mechanism 40A of the second embodiment is formed by a plurality of first click elements 64A formed in the housing 50A, a plurality of second click elements 56A formed on the washer 30A, and the urging member 70A.

As shown in FIG. 15, the first click elements 64A are a plurality of projections formed on the inward flange 54A of the housing 50A at equal angular intervals around the shaft axis AX. Each projection includes a first inclined surface 64a', a second inclined surface 64b', and a peak 64c' formed between the first inclined surface 64a' and the second inclined surface 64b'. The first and second inclined surfaces 64a' and 64b' of the second embodiment are inclined at different angles with respect to the inward flange 54A of the housing 50A. The first and second inclined surfaces 64a' and 64b' of the second embodiment may be inclined at the same angle. Although the first and second inclined surfaces 64a' and 64b' of the second embodiment are flat, the first and second inclined surfaces 64a' and 64b' may be curved. Although the first click element 64A of the second embodiment is a ridge-like elongated projection, the first click element 64A may be a tapered projection having a peak or a hemispherical projection.

Figure 16:
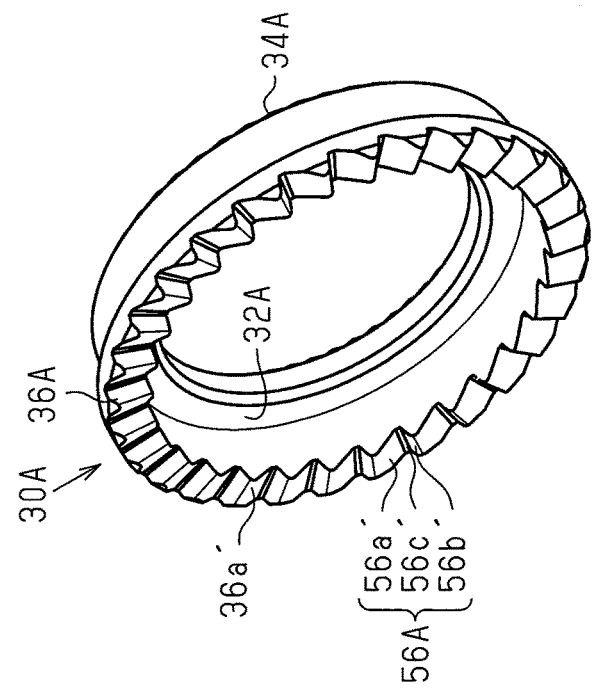
FIG. 16 is a perspective view of a washer that includes a click element.

As shown in FIG. 16, the rim 36A of the washer 30A includes an end surface 36a' at a side opposite to the non-smooth surface 34A. The end surface has a larger diameter than the smooth surface 32A. The second click elements 56A are a plurality of recesses formed in the end surface 36a' of the washer 30A at equal angular intervals around the shaft axis AX. Each recess includes a third inclined surface 56a', a fourth inclined surface 56b', and a bottom 56c' formed between the third inclined surface 56a' and the fourth inclined surface 56b'. The third and fourth inclined surfaces 56a' and 56b' are inclined at different angles with respect to the end surface 36a' of the washer 30A. The third and fourth inclined surfaces 56a' and 56b' may be inclined at the same angle. Although the third and fourth inclined surfaces 56a' and 56b' of the second embodiment are flat, the third and fourth inclined surfaces 56a' and 56b' may be curved. Although the second click element 56' of the second embodiment is a valley-like recess, the second click element 56' may be a dimple.

The click mechanism 40A of the second embodiment generates clicks when the first click elements 64A move over the second click elements 56A as the shaft 20A rotates. In this case, the housing 50A moves in the axial direction against the urging force of the urging member 70A.

Figure 19:
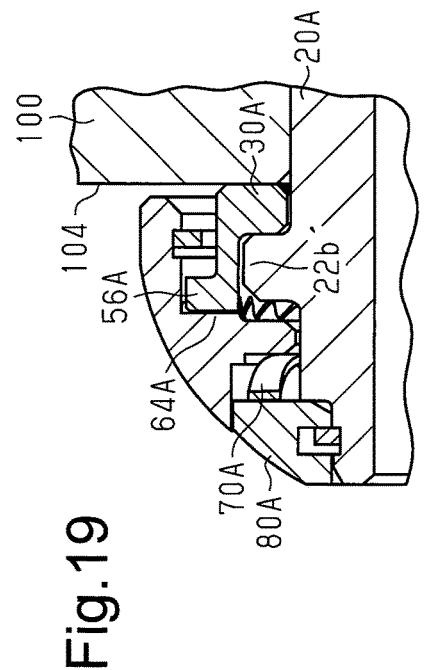

The property of the click mechanism 40A for limiting looseness will now be described with reference to FIGS. 18 and 19.

Figure 18:
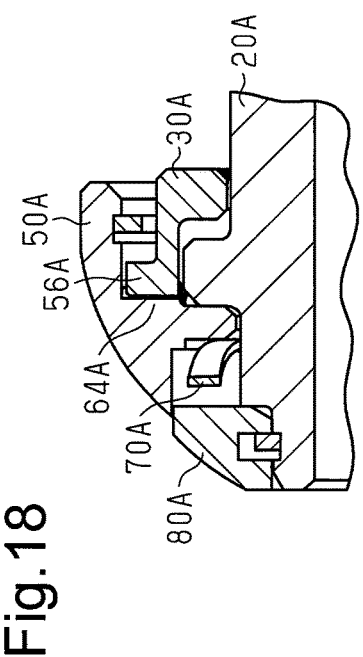

FIG. 18 shows the wheel securing axle 10 that is not coupled to the bicycle frame 100. A gap is formed between the washer 30A and the washer stopper 22b'. FIG. 19 shows the wheel securing axle 10 that is coupled to the bicycle frame 100. The washer 30A is in contact with the washer stopper 22b' and clamped between the washer stopper 22b' and the fastened surface 104 of the bicycle frame 100. The state of FIG. 19 is defined as a fastened state of the wheel securing axle 10. When the wheel securing axle 10 is in the fastened state, the urging force of the urging member 70A continuously presses the washer 30A toward the fastened surface 104. In this manner, the click mechanism 40A prevents or reduces spontaneous loosening of the wheel securing axle 10.

The second embodiment has the following advantages in addition to the advantages of the first embodiment.

(14) The second click elements 56A are formed on the rim 36A of the washer 30A. This structure allows for an increase in the number of the second click elements 56A. Also, the distance may be extended from the shaft axis AX to the second click elements 56A. This increases the degree of freedom for setting the torque threshold or the rotation resistance of the click mechanism 40A.

(15) The urging member 70A urges the housing 50A toward the washer 30A so that the housing 50A can move in the axial direction relative to the washer 30A. This structure allows the housing 50A and the washer 30A to move in the axial direction so that the distance between the housing 50A and the washer 30A becomes shorter countering the urging force of the urging member 70A. This prevents or reduces looseness of the wheel securing axle 10.

(16) The housing 50A is rotatable around the shaft axis AX together with or without the washer 30A. This structure keeps the washer 30 non-rotated when the housing 50A rotates integrally with the shaft 20A. This prevents or reduces damage to the fastened surface 104 caused by rotation of the washer 30.

(17) The shaft 20A includes the shaft opening 22c', which functions as a built-in socket formed in the end surface 22a' of the first end portion 22'. This structure allows for enlargement of an inner diameter of the engagement portion engaging a rotation tool. For example, the socket opening 68 of the first embodiment is rotated with a rotation tool of 4 mmφ, and the shaft opening 22c' of the second embodiment is rotated with a rotation tool of 6 mmφ. The socket opening 68 of the first embodiment may be rotated with a rotation tool of 5 or 6 mmφ. The shaft opening 22c' of the second embodiment may be rotated with a rotation tool of 5 or 6 mmφ.

Only several embodiments have been selected and described to illustrate the present invention. However, the present invention is not limited to the above embodiments (and one or more aspects of the embodiments). For example, the embodiment may be modified as follows.

Figure 21:
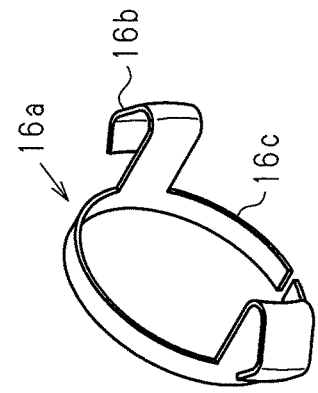
FIG. 21 is a perspective view of a modified example of the elastic element.
Figure 20:
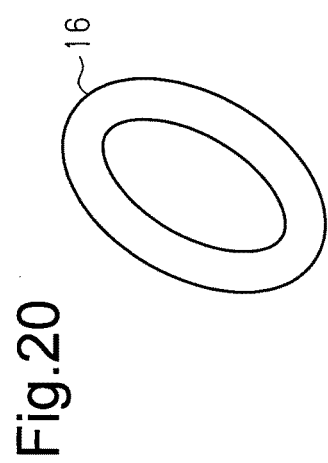
FIG. 20 is a perspective view of an elastic element.
Figure 22:
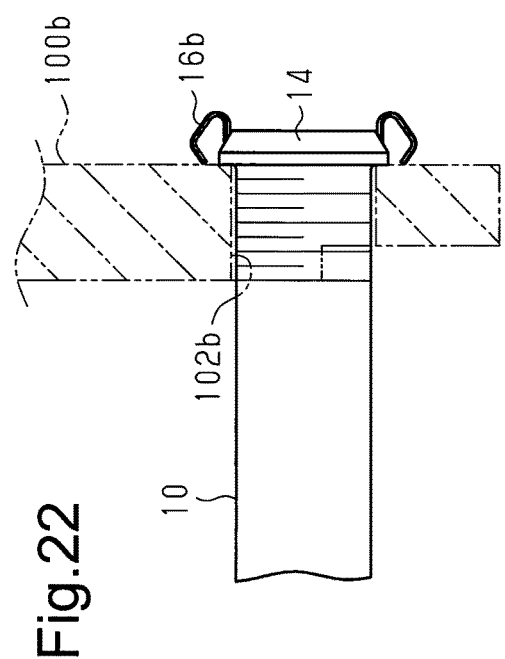
FIG. 22 is a cross-sectional view illustrating the use of the elastic element of FIG. 21.

As shown in FIG. 12, an elastic element 16 may be arranged on the second end portion 24A of the shaft 20A at a distal side of the threads to prevent separation of the shaft 20A. The elastic element 16 has the maximum outer dimension, which is larger than the diameter of the second end portion 24A, and may be elastically compressed to a compression dimension that is smaller than or equal to the diameter of the second end portion 24A. The elastic element 16 is, for example, an O-ring (FIG. 20). In a modified example of FIG. 21, an elastic element 16a includes at least one thin plate spring 16b and a C-shaped ring 16c. The thin plate spring 16b includes a free end and a basal end joined to the C-shaped ring 16c. As shown in FIG. 22, the thin plate spring 16b is arranged on the most distal end of the wheel securing axle 10.

Figure 23:
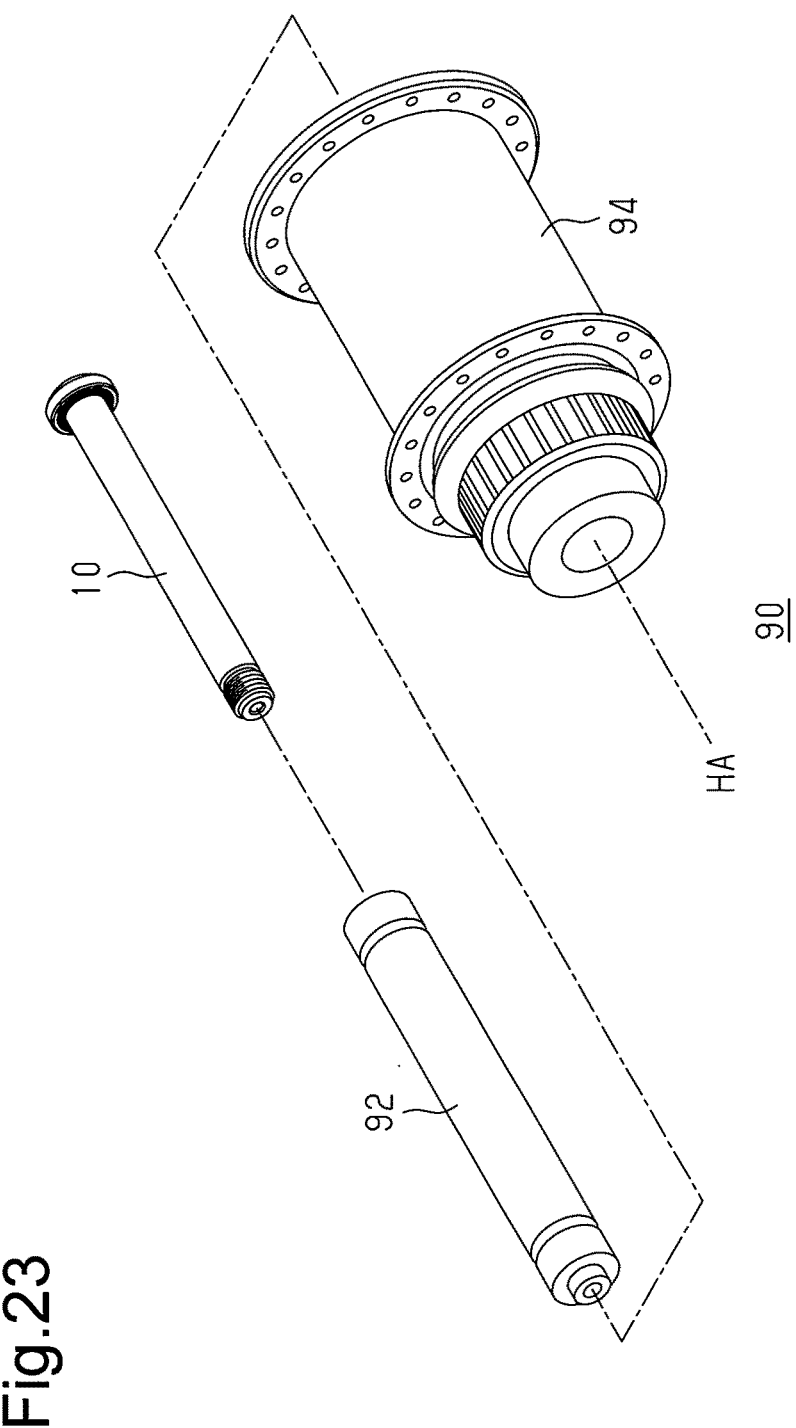
FIG. 23 is an exploded perspective view illustrating a bicycle hub assembly.

As shown in FIG. 23, the wheel securing axle 10 of the embodiments and the modified examples may cooperate with a hub axle 92 (also referred to as a hollow hub axle) and a hub shell 94 to form a bicycle assembly 90. The hub axle 92 having a hub axis HA is secured to the bicycle frame 100 by the wheel securing axle 10. The hub shell 94 is supported by the hub axle 92 and rotatable at least around the hub axis HA. The hub axle 92 and the hub shell 94 may be ones that are known and will not be described in detail.

In the embodiments, the projections and recesses of the click mechanism 40 may be switched with one another. For example, the first click elements 64 may be formed on the housing 50, and the second click elements 56 may be formed on the socket 60. The same configuration may be applied to the second embodiment.

The number of the first click elements 64 is not limited as long as there is at least one. The number of the second click elements 56 is not limited as long as there is at least one. When one of the first click elements 64 and the second click elements 56 includes one element, it is preferred that the other includes more than one element.

A nut may be fastened to the threaded second end portion 24 of the shaft 20. In this case, the hub support 100b of the bicycle frame 100 may include a through hole in lieu of the female-threaded through hole 102b.

The shaft 20 of the embodiment is a hollow body having a center through passage. The shaft 20, excluding the shaft opening 22c, may be a solid body.

The wheel securing axle 10 may be a front securing axle used to secure a front hub axle to the bicycle frame 100 or a rear securing axle used to secure a rear hub axle to the bicycle frame 100.

The term "comprising" and its derivatives, as used herein, are intended to be open-ended terms that specify the presence of the stated features, elements, components, groups, integers, and/or steps. This concept also applies to words of similar meaning, for example, the terms "have", "include" and their derivatives.

The term "contact" as used herein, encompasses configurations in which an element directly contacts another element; and configurations in which the element indirectly contacts the other element through adhesive.

The terms "part", "section," "portion," "member" or "element" when used in the singular can have the dual meaning of a single part or a plurality of parts.

The term "slant", "slanting", "slanted" or "inclined", as used herein, encompasses not only straight/linear configurations but also arching/curving/waved configurations as long as such configurations incline with respect to a baseline.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "a" or "an" entity refers to one or more of that entity. As such, the terms "a" (or "an"), "one or more" and "at least one" can be used interchangeably herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It should be apparent to those skilled in the art that the present invention may be embodied in many other specific forms without departing from the scope of the invention. For example, some components disclosed in the embodiments (and one or more aspects of the embodiments) may be omitted or combined. The present examples and embodiments are to be considered as illustrative and not restrictive, and the invention is not to be limited to the details given herein, but may be modified within the scope and equivalence of the appended claims.

The invention claimed is:

1. A wheel securing axle comprising:
a shaft that includes a first end portion, a second end portion including a thread, and a shaft axis;
a washer rotationally supported by the first end portion of the shaft; and
a click mechanism having a torque threshold so that the click mechanism generates clicks when a torsion moment between the washer and the shaft exceeds the torque threshold, wherein
the shaft includes a shaft opening formed in an end surface of the first end portion,
the wheel securing axle further includes a socket fitted to the shaft opening,
the click mechanism includes
at least one first click element formed on one of the socket and a housing,
at least one second click element formed on the other of the socket and the housing, and
an urging member that is arranged in the shaft opening and urges the socket toward the housing in an axial direction so that the first click element engages the second click element, wherein
the socket includes a socket opening and an outward flange,
the housing includes an inward flange that includes a center hole allowing a rotation tool to physically access the socket opening, and
the at least one first click element and the at least one second click element are formed on the outward flange of the socket and the inward flange of the housing respectively.

2. The wheel securing axle according to claim 1, wherein the click mechanism is configured to allow the shaft to rotate around the shaft axis when the washer is in contact with a fastened surface and kept from rotating relative to the fastened surface.

3. The wheel securing axle according to claim 2, wherein the click mechanism is configured so that the washer rotates integrally with the shaft at least when the washer is not in contact with the fastened surface.

4. The wheel securing axle according to claim 2, further comprising a housing that is coupled to the first end portion and accommodates at least a portion of the washer,
wherein the click mechanism is configured so that the shaft rotates integrally with the housing and the washer at least when the washer is not in contact with the fastened surface.

5. The wheel securing axle according to claim 1, wherein a housing is supported by the shaft so that the housing is rotatable around the shaft axis together with or free from the washer.

6. The wheel securing axle according to claim 1, wherein
the at least one first click element is a plurality of projections formed around the shaft axis at equal angular intervals,
each of the projections includes first and second inclined surfaces inclined at the same angle or at different angles and a peak formed between the first and second inclined surfaces.

7. The wheel securing axle according to claim 1, wherein
the at least one second click element is a plurality of recesses formed around the shaft axis at equal angular intervals,
each of the recesses includes third and fourth inclined surfaces that are inclined at the same angle or at different angles and a bottom formed between the third and fourth inclined surfaces.

8. The wheel securing axle according to claim 1, wherein the socket is movable in the axial direction relative to the shaft when the washer is in contact with a fastened surface.

9. The wheel securing axle according to claim 1, wherein the washer, the housing, and the socket each are movable in the axial direction relative to the shaft at least when the washer is not in contact with a fastened surface.

10. The wheel securing axle according to claim 1, wherein the shaft includes
a shaft circumferential surface that supports the washer so that the washer is movable in the axial direction, and
a washer stopper that projects from the shaft circumferential surface in a radially outward direction and limits movement of the washer in the axial direction by contacting the washer in the axial direction,
the click mechanism includes an urging member that generates an elastic repulsion force in the axial direction to allow the washer stopper to rotate relative to the washer while contacting the washer when the washer is in contact with a fastened surface.

11. The wheel securing axle according to claim 10, wherein the washer is a cup-shaped washer that surrounds an outer side of the washer stopper.

12. The wheel securing axle according to claim 10, wherein the washer includes
a non-smooth surface that contacts the fastened surface, and
a smooth surface that contacts the washer stopper.

13. The wheel securing axle according to claim 1, further comprising an elastic element that is arranged on the second end portion of the shaft toward a distal side from the thread to prevent separation of the shaft, wherein the elastic element has a maximum outer dimension that is larger than a diameter of the thread, and the elastic element is capable of being elastically compressed to the diameter of the thread or smaller.

14. The wheel securing axle according to claim 1, wherein the shaft is a hollow body including a center through passage.

15. A bicycle hub assembly comprising:
the wheel securing axle according to claim 1;
a hub axle that includes a hub axis and is secured to a bicycle frame by the wheel securing axle; and
a hub shell that is supported by the hub axle to be rotatable at least around the hub axis.

* * * * *